United States Patent
Das et al.

(10) Patent No.: US 10,298,649 B2
(45) Date of Patent: May 21, 2019

(54) GUARANTEEING STREAM EXCLUSIVITY IN A MULTI-TENANT ENVIRONMENT

(71) Applicant: Microsoft Technology Licensing, LLC, Redmond, WA (US)

(72) Inventors: Rajsekhar Das, Kirkland, WA (US); Tristan C. Griffith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/629,054

(22) Filed: Jun. 21, 2017

(65) Prior Publication Data

US 2018/0234478 A1 Aug. 16, 2018

Related U.S. Application Data

(60) Provisional application No. 62/459,408, filed on Feb. 15, 2017.

(51) Int. Cl.
| | |
|---|---|
| *H04L 29/06* | (2006.01) |
| *G06F 3/06* | (2006.01) |
| *G06F 17/30* | (2006.01) |
| *G06F 12/02* | (2006.01) |

(52) U.S. Cl.
CPC .......... *H04L 65/604* (2013.01); *G06F 3/0622* (2013.01); *G06F 3/0652* (2013.01); *G06F 3/0659* (2013.01); *G06F 3/0688* (2013.01); *G06F 12/0246* (2013.01); *G06F 17/30725* (2013.01)

(58) Field of Classification Search
CPC ................................................ G06F 17/30159
See application file for complete search history.

(56) References Cited

U.S. PATENT DOCUMENTS 7,958,200 B2 * 6/2011 Rand McFadden ........................ G06F 17/30067 707/E17.01
8,918,908 B2 12/2014 Ziskind et al.
(Continued)

OTHER PUBLICATIONS

Gonzalez, et al., "Multi-Tenant I/O Isolation with Open-Channel SSDs", In Proceedings of Non-Volatile Memories Workshop Conference, Mar. 2017, 3 pages.
(Continued)

*Primary Examiner* — Min Huang
(74) *Attorney, Agent, or Firm* — Baker & Hostetler LLP

(57) ABSTRACT

A file system is configured to ensure exclusive access by an application to a "stream" comprising one or more erase blocks on a storage device. The file system may receive, from an application, a request for a stream identifier token, create a file to store one or more stream identifiers associated with the application, send, to the application, a token associated with the file, the token providing access to the one or more stream identifiers by the application, receive, from the application, a request for access to a stream, the request comprising the token, determine that a stream is available, the stream comprising one or more erase blocks on a storage device, send, to the application, a stream identifier associated with the stream, and remove the stream identifier from a pool of available stream identifiers, thereby ensuring exclusive access to the stream by the application.

20 Claims, 10 Drawing Sheets

(56) References Cited

U.S. PATENT DOCUMENTS

| | | | | |
|---|---|---|---|---|
| 9,043,549 | B2* | 5/2015 | Chiang | G06F 12/0866 |
| | | | | 711/115 |
| 2005/0120125 | A1* | 6/2005 | Morten | G06F 21/10 |
| | | | | 709/231 |
| 2010/0235899 | A1* | 9/2010 | Li | G06F 12/0888 |
| | | | | 726/9 |
| 2011/0271074 | A1* | 11/2011 | Lyu | G06F 12/023 |
| | | | | 711/173 |
| 2013/0305039 | A1* | 11/2013 | Gauda | G06F 21/6218 |
| | | | | 713/153 |
| 2015/0149297 | A1* | 5/2015 | Mahadevan | H04W 4/21 |
| | | | | 705/14.66 |
| 2015/0161038 | A1* | 6/2015 | Lee | G06F 12/0246 |
| | | | | 711/103 |
| 2015/0199241 | A1* | 7/2015 | Zhuang | G06F 17/30159 |
| | | | | 707/692 |
| 2015/0200858 | A1* | 7/2015 | Zhuang | H04L 47/22 |
| | | | | 709/205 |
| 2016/0021182 | A1 | 1/2016 | Bansal et al. | |
| 2016/0291872 | A1* | 10/2016 | Hashimoto | G06F 3/0644 |
| 2016/0378516 | A1 | 12/2016 | Barry et al. | |
| 2017/0123678 | A1 | 5/2017 | Singhai et al. | |
| 2017/0287104 | A1* | 10/2017 | Risinger | G06T 1/60 |
| 2018/0026654 | A1* | 1/2018 | Gopal | H03M 7/40 |
| | | | | 341/51 |

OTHER PUBLICATIONS

"Multi-Stream SSD Technology", https://regmedia.co.uk/2016/09/23/0_storage-intelligence-prodoverview-2015-0.pdf, Published on: Sep. 23, 2016, 2 pages.

Kang, et al., "The Multi-streamed Solid-State Drive", In Proceedings of 6th USENIX Conference on Hot Topics in Storage and File Systems, Jun. 17, 2014, 5 pages.

Desnoyers, Peter, "Analytic modeling of SSD write performance", In Proceedings of 5th Annual International Systems and Storage Conference, Jun. 4, 2012, 10 pages.

* cited by examiner

GUARANTEEING STREAM EXCLUSIVITY IN A MULTI-TENANT ENVIRONMENT

CROSS REFERENCE TO RELATED APPLICATIONS

This application claims the benefit of U.S. provisional application No. 62/459,408 filed on Feb. 15, 2017, which is incorporated herein by reference in its entirety.

BACKGROUND

Solid state devices (SSDs), such as flash storage, offer benefits over traditional hard disk drives (HDDs). For example, SSDs are often faster, quieter and draw less power than their HDD counterparts. However, there are also drawbacks associated with SSDs. For example, SSDs are limited in the sense that data can only be erased from the storage device in blocks, also known as "erase blocks." These blocks may contain, in addition to data that a user wishes to erase, important data that the user wishes to keep stored on the SSD. In order to erase the unwanted data, the SSD must perform a process known as "garbage collection" in order to move data around on the SSD so that important files are not accidentally deleted. However, this process may result in an effect known as "write amplification" where the same data is written to the physical media on the SSD multiple times, shortening the lifespan of the SSD. Streaming is a process by which data stored on the SSD may be grouped together in a stream comprising one or more erase blocks based, for example, on an estimated deletion time of all of the data in the stream. By storing data that is likely to be deleted together in the same erase block or group of erase blocks (i.e., the same stream), a number of the problems associated with SSD storage may be alleviated. As streaming becomes more widely used, it may be desirable that multiple tenants, for example, applications residing on a computing device, wish to access the streaming functionality of a given SSD.

SUMMARY

Methods and systems for organizing stream identifiers and for granting exclusive access to a stream associated with a given stream identifier are disclosed herein. In one embodiment, a file system associated with a computing device may be configured to receive, from an application, a request for a stream identifier token, create a file to store one or more stream identifiers associated with the application, send, to the application, a token associated with the file, the token providing access to the one or more stream identifiers by the application, receive, from the application, a request for access to a stream, the request comprising the token, determine that a stream is available, the stream comprising one or more erase blocks on a storage device, send, to the application, a stream identifier associated with the stream, and remove the stream identifier from a pool of available stream identifiers, thereby ensuring exclusive access to the stream by the application.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION

Disclosed herein are methods and systems for ensuring exclusive access to a stream by a tenant, such as an application residing on a computing device. In one embodiment, a method for ensuring exclusive access to a stream may comprise receiving, from an application, a request for a stream identifier token, creating a file to store one or more stream identifiers associated with the application, sending, to the application, a token associated with the file, the token providing access to the one or more stream identifiers by the application, receiving, from the application, a request for access to a stream, the request comprising the token, determining that a stream is available, the stream comprising one or more erase blocks on a storage device, sending, to the application, a stream identifier associated with the stream, and removing the stream identifier from a pool of available stream identifiers, thereby ensuring exclusive access to the stream by the application.

Figure 1:
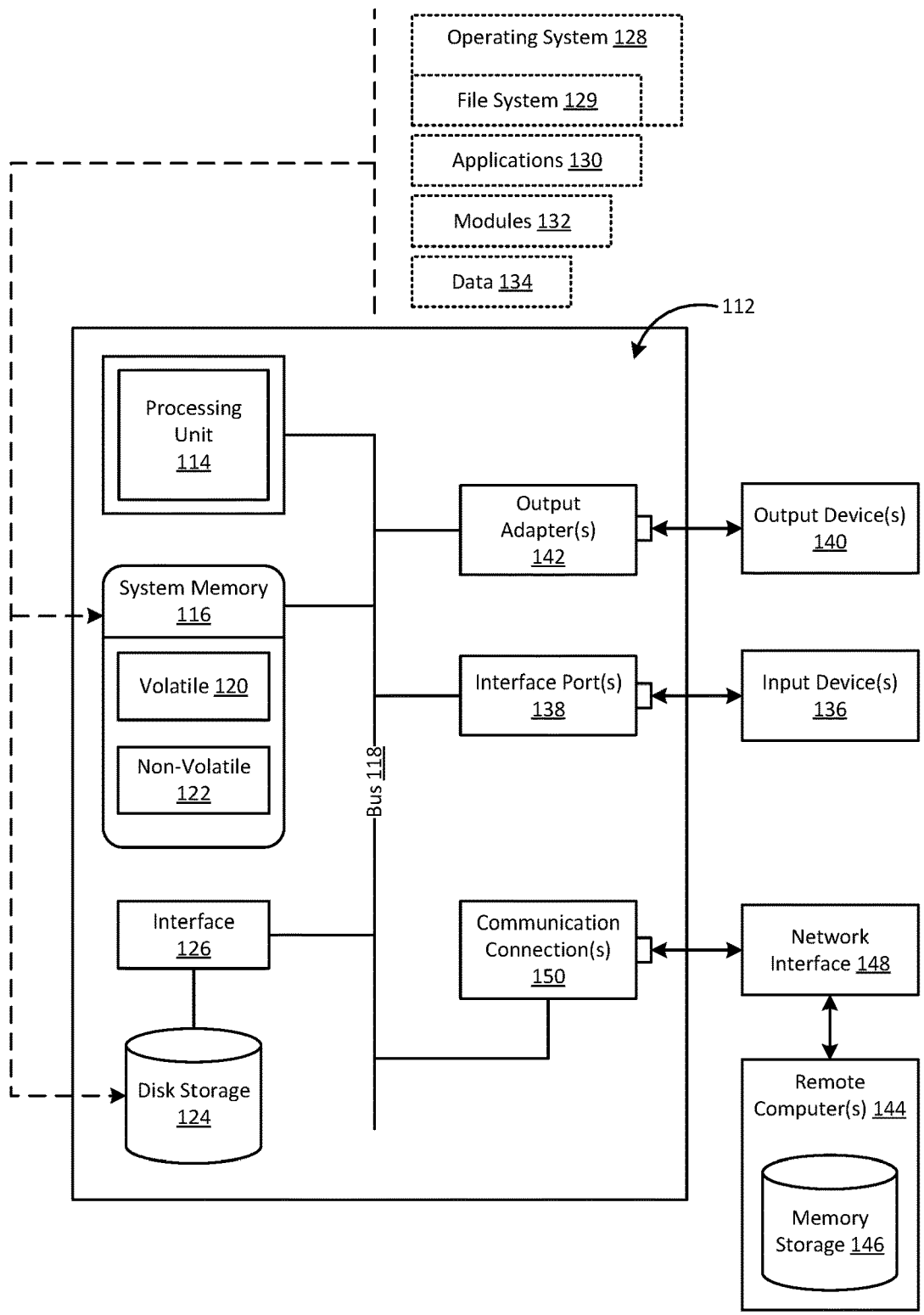
FIG. 1 illustrates an example computing device, in which the aspects disclosed herein may be employed.

FIG. 1 illustrates an example computing device 112 in which the techniques and solutions disclosed herein may be implemented or embodied. The computing device 112 may be any one of a variety of different types of computing devices, including, but not limited to, a computer, personal computer, server, portable computer, mobile computer, wearable computer, laptop, tablet, personal digital assistant, smartphone, digital camera, or any other machine that performs computations automatically.

The computing device 112 includes a processing unit 114, a system memory 116, and a system bus 118. The system bus 118 couples system components including, but not limited to, the system memory 116 to the processing unit 114. The processing unit 114 may be any of various available processors. Dual microprocessors and other multiprocessor architectures also may be employed as the processing unit 114.

The system bus 118 may be any of several types of bus structure(s) including a memory bus or memory controller, a peripheral bus or external bus, and/or a local bus using any variety of available bus architectures including, but not limited to, Industry Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 116 includes volatile memory 120 and nonvolatile memory 122. The basic input/output system (BIOS), containing the basic routines to transfer information between elements within the computing device 112, such as during start-up, is stored in nonvolatile memory 122. By way of illustration, and not limitation, nonvolatile memory 122 may include read only memory (ROM), programmable ROM (PROM), electrically programmable ROM (EPROM), electrically erasable ROM (EEPROM), or flash memory. Volatile memory 120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computing device 112 also may include removable/non-removable, volatile/non-volatile computer-readable storage media. FIG. 1 illustrates, for example, secondary storage 124. Secondary storage 124 includes, but is not limited to, devices like a magnetic disk drive, floppy disk drive, tape drive, Jaz drive, Zip drive, LS-100 drive, memory card (such as an SD memory card), or memory stick. In addition, secondary storage 124 may include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the secondary storage 124 to the system bus 118, a removable or non-removable interface is typically used such as interface 126.

FIG. 1 further depicts software that acts as an intermediary between users and the basic computer resources described in the computing device 112. Such software includes an operating system 128. Operating system 128, which may be stored on secondary storage 124, acts to control and allocate resources of the computing device 112. Applications 130 take advantage of the management of resources by operating system 128 through program modules 132 and program data 134 stored either in system memory 116 or on secondary storage 124. It is to be appreciated that the aspects described herein may be implemented with various operating systems or combinations of operating systems. As further shown, the operating system 128 includes a file system 129 for storing and organizing, on the secondary storage 124, computer files and the data they contain to make it easy to find and access them.

A user may enter commands or information into the computing device 112 through input device(s) 136. Input devices 136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 114 through the system bus 118 via interface port(s) 138. Interface port(s) 138 include, for example, a serial port, a parallel port, a game port, and a universal serial bus (USB). Output device(s) 140 use some of the same type of ports as input device(s) 136. Thus, for example, a USB port may be used to provide input to computing device 112, and to output information from computing device 112 to an output device 140. Output adapter 142 is provided to illustrate that there are some output devices 140 like monitors, speakers, and printers, among other output devices 140, which require special adapters. The output adapters 142 include, by way of illustration and not limitation, video and sound cards that provide a means of connection between the output device 140 and the system bus 118. It should be noted that other devices and/or systems of devices provide both input and output capabilities such as remote computer(s) 144.

Computing device 112 may operate in a networked environment using logical connections to one or more remote computing devices, such as remote computing device(s) 144. The remote computing device(s) 144 may be a personal computer, a server, a router, a network PC, a workstation, a microprocessor based appliance, a peer device, another computing device identical to the computing device 112, or the like, and typically includes many or all of the elements described relative to computing device 112. For purposes of brevity, only a memory storage device 146 is illustrated with remote computing device(s) 144. Remote computing device(s) 144 is logically connected to computing device 112 through a network interface 148 and then physically connected via communication connection 150. Network interface 148 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 150 refers to the hardware/software employed to connect the network interface 148 to the bus 118. While communication connection 150 is shown for illustrative clarity inside computing device 112, it may also be external to computing device 112. The hardware/software necessary for connection to the network interface 148 includes, for exemplary purposes only, internal and external technologies such as modems including regular telephone grade modems, cable modems and DSL modems, ISDN adapters, and Ethernet cards.

As used herein, the terms "component," "system," "module," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

Figure 2:
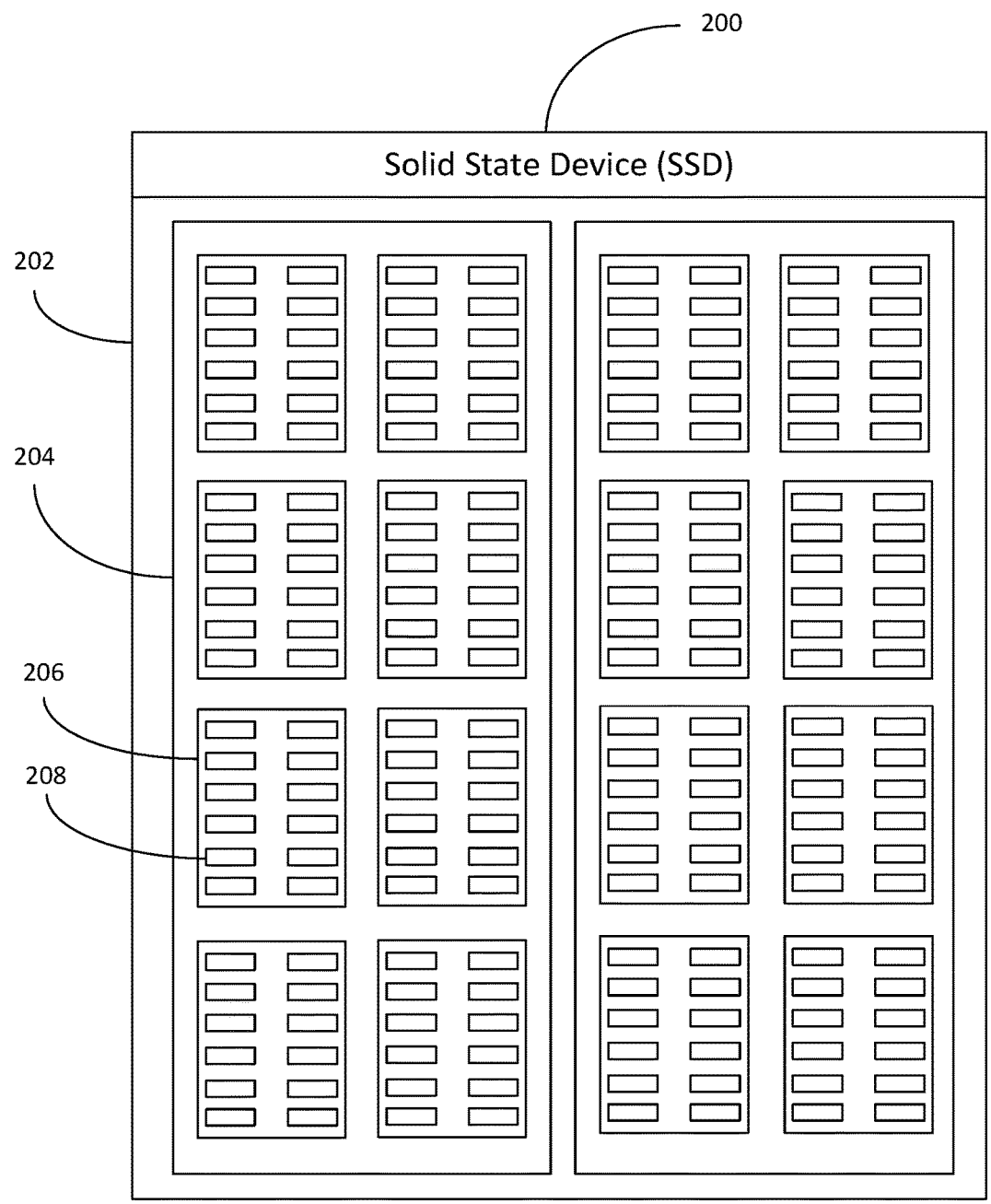
FIG. 2 illustrates an example solid state device (SSD)

FIG. 2 illustrates an example solid state device (SSD) 200. The SSD illustrated in FIG. 2 may be, for example, a NAND flash storage device. The SSD 200 may, for example, be used to implement the secondary storage 124 of the example computing device shown in FIG. 1. As shown, the SSD may comprise a die 202. A die may represent the smallest unit of the SSD that can independently execute commands. While the SSD in FIG. 2 comprises only a single die, it is understood that an SSD may comprise any number of die. As further shown in FIG. 2, each die may comprise one or more planes 204. An SSD may typically comprise one or two planes, and concurrent operations may take place on each plane. However, it is understood that an SSD may comprise any number of planes. As further illustrated in FIG. 2, each plane 204 may comprise a number of blocks 206. A block may be the smallest unit of the SSD that can be erased. Blocks may also be referred to herein as "erase blocks." Finally, as shown in FIG. 2, each block 206 may comprise a number of pages 208. A page may be the smallest unit of the SSD that can be programmed.

Program operations on the SSD, also known as "writes" or "write operations," may be made to any given page on the SSD. A page may be, for example, about 4-16 KB in size, although it is understood that any size may be used. In contrast, erase operations may be only be made at the block level. A block may be, for example, about 4-8 MB in size, although it is understood that any size may be used. A controller associated with the SSD may manage the flash memory and interface with the host system using a logical-to-physical mapping system, for example, logical block addressing (LBA).

SSDs generally do not allow for data stored in a given page to be updated. When new or updated data is saved to the SSD, the controller may be configured to write the new or updated data in a new location on the SSD and to update the logical mapping to point to the new physical location. This new location may be, for example, a different page within the same erase block, as further illustrated in FIG. 3. At this point, the data in the old location may no longer be valid, and may need to be erased before the location can be written to again.

However, as discussed above, the old or invalid data may not be erased without erasing all of the data within the same erase block. For example, that erase block may contain the new or updated data, as well as other data that a user may wish to keep stored on the SSD. In order to address this issue, the controller may be configured to copy or re-write all of the data that is not intended to be deleted to new pages in a different erase block. This may be referred to herein as "garbage collection." The new or updated data may be written directly to a new page or may be striped across a number of pages in the new erase block. This undesirable process by which data is written to the SSD multiple times as a result of the SSDs inability to update data is known as write amplification, and is further illustrated below in connection with FIG. 3. Write amplification presents a significant problem in SSD storage as SSDs can only be programmed and erased a limited number of times. This may be referred to herein as the number of program/erase cycles that the SSD can sustain.

Figure 3A:
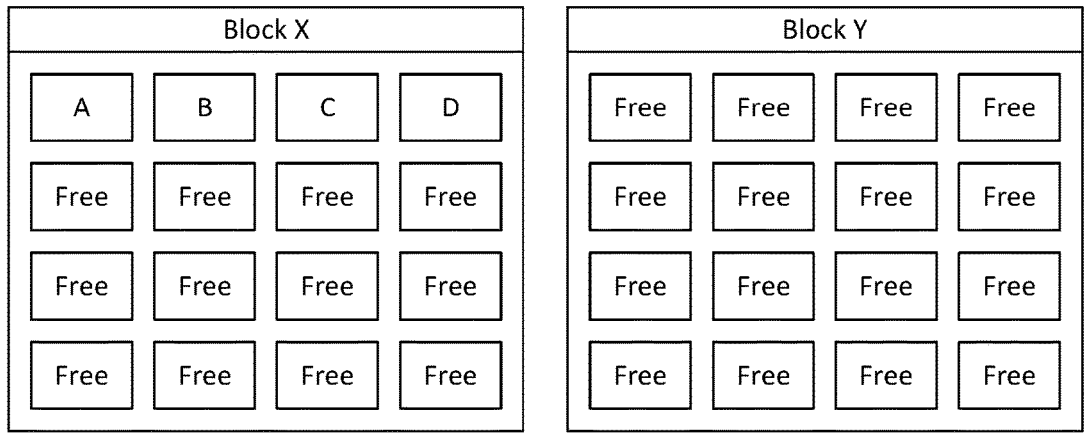
FIGS. 3A-3D illustrate a process of garbage collection performed on the SSD.

As shown in FIG. 3A, an SSD may comprise two blocks: Block X and Block Y. It is understood that while the SSD illustrated in FIGS. 3A-3D comprises two blocks, an SSD may comprise any number of blocks. As discussed above, a block or "erase block" may comprise the smallest unit of the SSD that may be erased. Each of Block X and Block Y illustrated in FIGS. 3A-3D comprises sixteen pages, however, it is understood that a given block may comprise any number of pages. Data may be written directly to any one of the pages on Block X or Block Y. In addition, data may be striped across a plurality of pages associated with Block X or Block Y. As shown in FIG. 3A, data may be written to Page A, Page B, Page C and Page D associated with Block X, while the remaining pages of Block X may be left empty (free). Block Y may similarly be left empty.

Figure 3B:
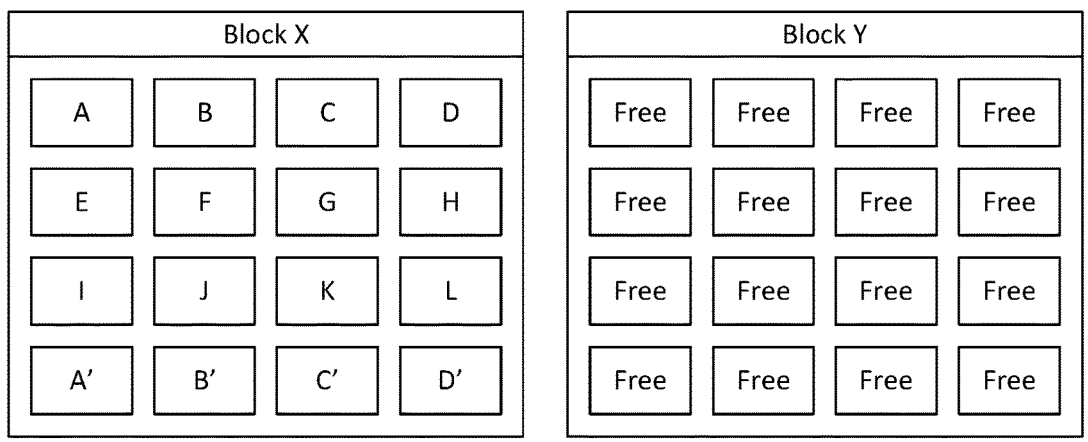

As shown in FIG. 3B, additional data may be written to Block X at a later time via a write operation by the controller. Again, this write operation may comprise writing data directly to any one of the pages in Block X or Block Y or striping the data across a plurality of the pages. For example, data may be written directly to or striped across Page E, Page F, Page G, Page H, Page I, Page J, Page K and Page L associated with Block X. In addition, a user or application may wish to update the information stored at Pages A-D of FIG. 3A. However, as discussed above, the SSD may not allow for data to be updated. Thus, in order to store the new data, a controller associated with the SSD may be configured to execute a write operation to additional pages in Block X representing the updates to Pages A-D. These pages, as illustrated in FIG. 3B, may be labeled as Page A', Page B', Page C' and Page D'. The data stored at Pages A'-D' may represent any of minor or major updates to the data stored at Pages A-D.

Figure 3C:
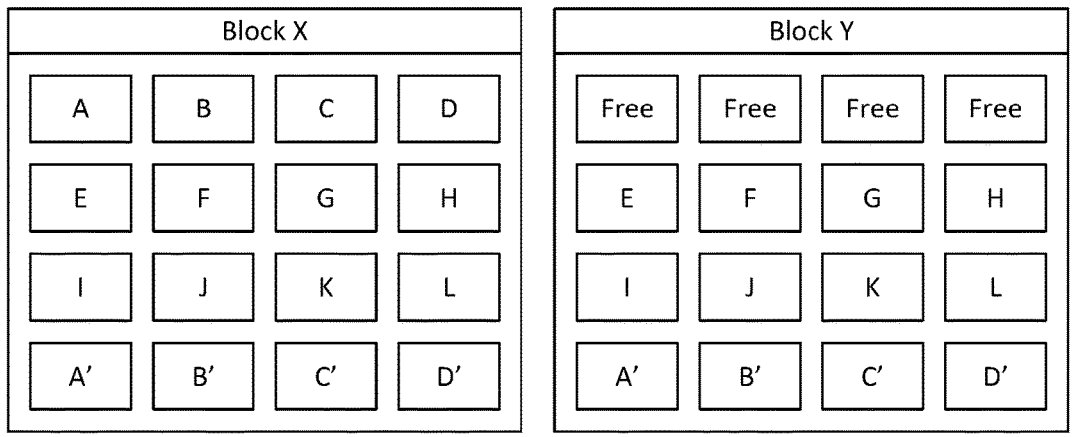

As further illustrated in FIG. 3C, in order to perform a delete operation on the data stored at Pages A-D, and as further discussed above, the entirety of Block X may need to be erased. The controller associated with the SSD may be configured to copy or re-write important data on Block X that the user does not wish to be deleted to a different erase block, for example, Block Y. As illustrated in FIG. 3C, the controller may be configured to copy the data stored at Pages E-L as well as the data stored at Pages A'-D' of Block X to Block Y.

As discussed above, this process of "updating" data to a new location may be referred to "garbage collection." The process of garbage collection as illustrated in FIG. 3C may address the issue of erasing unwanted data while keeping important data stored on the device. However, this comes at the cost of copying and re-writing a single piece of data multiple times on the same SSD. For example, both Block X and Block Y of the SSD may contain copies of the data stored at Pages E-L as well as the data stored at Pages A'-D'. This undesirable process of re-writing multiple copies of the same data may be known as write amplification.

Figure 3D:
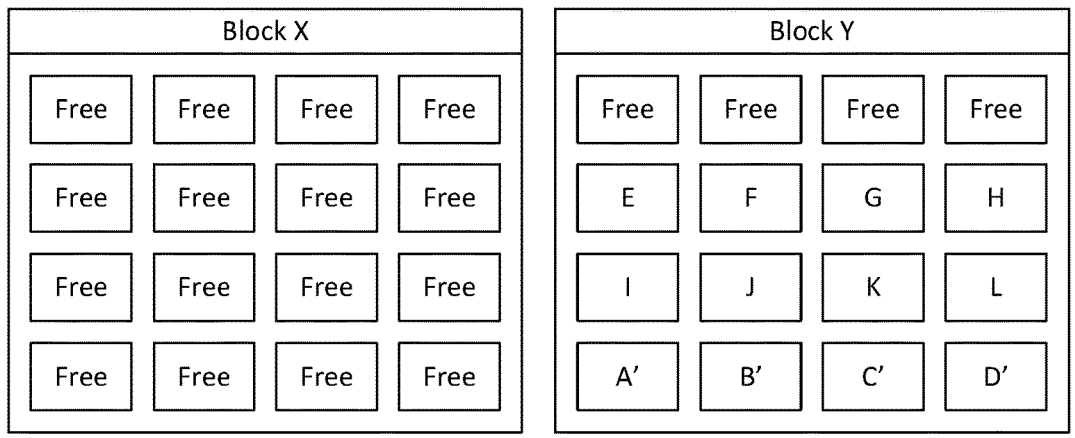

Finally, as shown in FIG. 3D, the controller may be configured to erase all of the data stored at Block X. As all of the important data intended to be kept on the SSD has been copied to Block Y, the entirety of Block X may be deleted by the controller. Once this process has completed, the controller may be configured to write new data to any of the pages in Block X. However, as discussed above, this process of write amplification presents a significant problem in SSD storage as an SSD may only be programmed and erased a limited number of times. For example, in the case of a single level flash, the SSD may be written to and erased a maximum of 50,000-100,000 times.

One additional feature associated with SSD storage is the over-provisioning of storage space. Over-provisioning may be represented as the difference between the physical capacity of the flash memory and the logical capacity presented through the operating system as available for the user. During, for example, the process of garbage collection, the additional space from over-provisioning may help lower the write amplification when the controller writes to the flash memory. The controller may use this additional space to keep track of non-operating system data such as, for example, block status flags. Over-provisioning may provide reduced write amplification, increased endurance and increased performance of the SSD. However, this comes at the cost of less space being available to the user of the SSD for storage operations.

Solid state devices may support functionality known as "streaming" by which data may be associated with a particular stream based, for example, on an estimated deletion time of the data, in order to reduce the problems associated with write amplification and over-provisioning. A stream, as discussed herein, may comprise one or more erase blocks. The process of streaming SSDs may comprise, for example, instructing the SSD to associate a bunch of data together in the same erase block or group of erase blocks (i.e., in the same "stream") because it is likely that all of the data will be erased at the same time. Because data that will be deleted together will be written to or striped across pages in the same erase block or group of erase blocks, the problems associated with write amplification and over-provisioning can be greatly reduced. The process of streaming SSDs may be further illustrated as shown in connection with FIG. 4.

Figure 4:
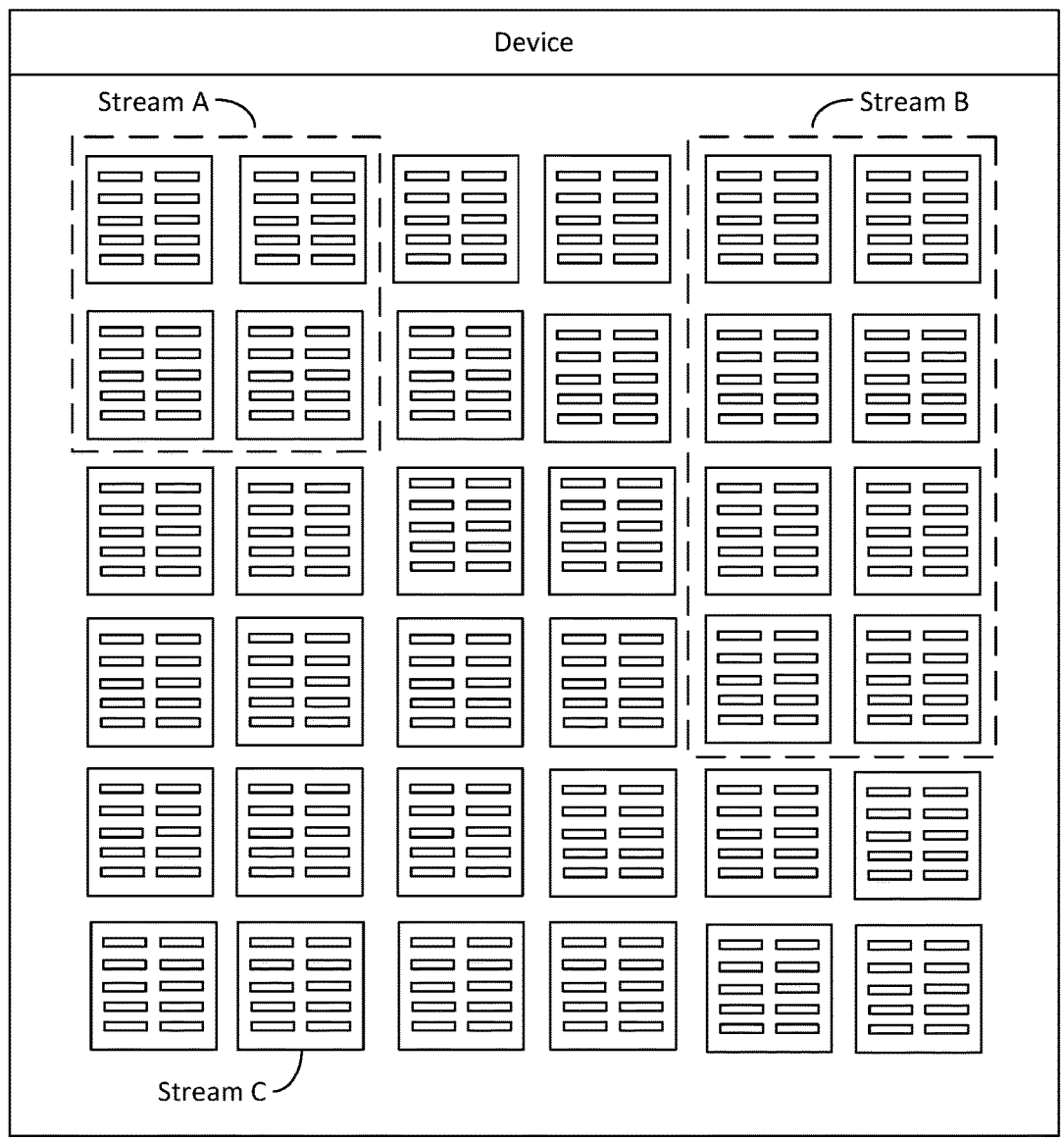
FIG. 4 illustrates a process of streaming multiple erase blocks on a device, for example, on an SSD.

As shown in the example of FIG. 4, data may be grouped together in one or more erase blocks based, for example, on an estimated erase time of the data stored at each of the erase blocks. The controller may organize the one or more erase blocks such that data in each of the erase blocks may be erased together. This organization of data into one or more erase blocks based, for example, on an estimated deletion time of the data in the one or more erase blocks, may be referred to herein as "streaming." As shown in FIG. 4, four erase blocks may be associated with Stream A, eight erase blocks may be associated with Stream B, and a single erase block may be associated with Stream C. The controller may be configured, for example, to perform all write operations of data that may be erased within two months to Stream A, all write operations of data that may be erased within two weeks to Stream B, and all write operations of data that may be erased within two days to Stream C. In another example, the controller may be configured to perform write operations to Stream A that may be erased upon the occurrence of an event that would result in all of the data written to Stream A being "updated" and subsequently marked as invalid.

A file system and a storage driver associated with a computing device may be provided with awareness of the "streaming" capability of an SSD in order to enable the file system and/or an application to take advantage of the streaming capability for more efficient storage. For example, a file system may be configured to receive a first request from an application to associate a file with a particular stream identifier available on a storage device, intercept one or more subsequent requests to write data to the file, associate the one or more subsequent requests with the stream identifier, and instruct a storage driver associated with the storage device to write the requested data to the identified stream. The file system may be further configured to store metadata associated with the file, the metadata comprising the stream identifier associated with the file. In addition, the file system may be configured to send to the application a plurality of stream parameters associated with the stream. The file system may be further configured, prior to associating the file with the stream identifier, to validate the stream identifier.

Figure 5:
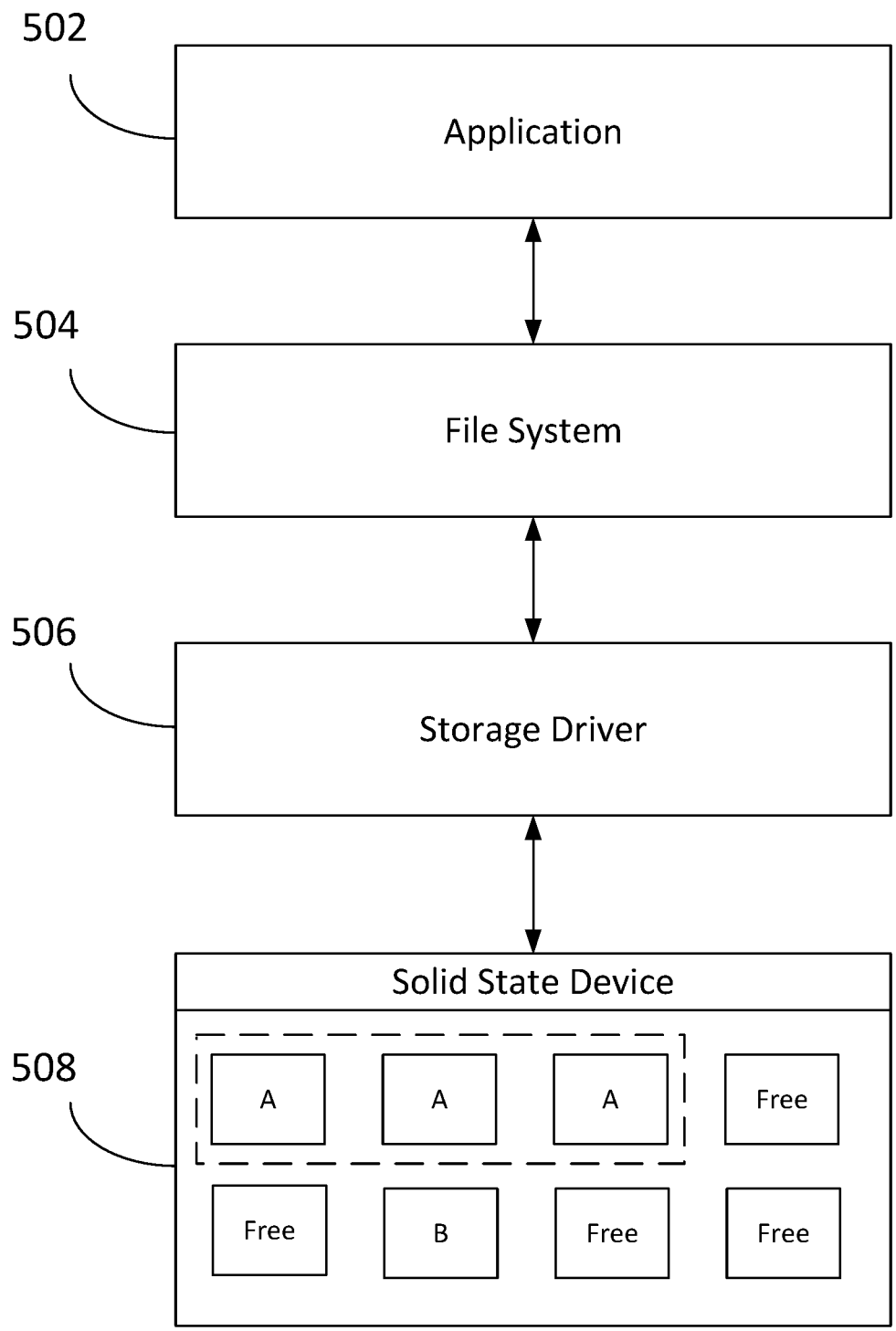
FIG. 5 illustrates an example architecture for implementing streaming functionality on a device.

FIG. 5 is a block diagram illustrating example components of an architecture for implementing the streaming SSD functionality disclosed herein. As shown, in one embodiment, the architecture may comprise an application 502, a file system 504, a storage driver 506, and a device 508.

The application 502 may be configured to read and write files to the device 508 by communicating with the file system 504 and the storage driver 506. In order to take advantage of writing to a stream on the SSD, the application 502 must instruct the file system which ID to associate with a given file. The application 502 may be configured to instruct the file system which ID goes with the given file based, for example, on a determination that all of the data within the erase block that the file is located may be deleted at the same time. In one embodiment, multiple erase blocks may be tagged with a particular stream ID. For example, using the device illustrated in FIG. 5, multiple erase blocks may be associated with Stream A, and data may be written directly to a given one of the erase blocks or striped across multiple pages associated with the erase blocks in Stream A. In addition, Stream B may comprise a single erase block, and data may be written to a given one of the pages or striped across multiple pages associated with the erase block associated with Stream B. The data associated with Stream A may have a different estimated deletion time than the data associated with Stream B.

The file system 504 may be configured to expose an application programming interface (API) to the application 502. For example, the application 502, via an API provided by the file system 504, may be configured to tag a file with a particular stream ID. In addition, the application 502, via an API provided by the file system 504, may be configured to perform stream management, such as, for example, determining how many streams can be written to simultaneously, what stream IDs are available, and the ability to close a given stream. Further, the application 502, via an API provided by the file system 504, may be configured to determine a number of parameters associated with the stream such as, for example, the optimal write size associated with the stream.

The file system 504 may be further configured to intercept a write operation by the application 502 to a file in the device 508, determine that the file is associated with a particular stream ID with the file, and to tag the write operation (i.e., I/O call) with the stream ID. The file system 504 may be further configured to store metadata associated with each file of the device 508, and to further store the particular stream ID associated with each file along with the file metadata.

The storage driver 506 may be configured to expose an API to the file system 504. For example, the file system 504, via an API provided by the storage driver 506, may be configured to enable stream functionality on the storage device 508. The file system 504, via an API provided by the storage driver 506, may be further configured to discover existing streams on the device 508. The file system 504, via an API provided by the storage driver 506, may be further configured to obtain information from the device such as, for example, the ability of the device to support streams and what streams, if any, are currently open on the device. The storage driver 506 may be configured to communicate with the device 508 and to expose protocol device agnostic interfaces to the file system 504 so that the storage driver 506 may communicate with the device 508 without the file system 504 knowing the details of the particular device.

The device 508 may comprise, for example, an SSD. The SSD illustrated in FIG. 5, for example, comprises eight erase blocks. Data may be written individually to a given erase block or may be striped across a plurality of the erase blocks in order to maximize throughput on the SSD. As also shown in 508, and as further discussed herein, the plurality of erase blocks may be organized in streams such that data can be erased in a more efficient manner. For example, the SSD illustrated in FIG. 5 comprises Stream A which is associated with three erase blocks and Stream B which is associated with a single erase block.

As discussed herein, streaming is a process by which data stored on an SSD may be grouped together in a stream comprising one or more erase blocks based, for example, on an estimated deletion time of all of the data in the stream. By storing data that is likely to be deleted together in the same erase block or group of erase blocks, numerous problems associated with SSD storage can be alleviated. However, when there are multiple tenants, for example, applications residing on a computing device, that want to access the streaming functionality of the SSD, it is likely that each tenant may want exclusive access to one or more of the streams. In other words, it is unlikely that individual tenants will know about each other or want their data to be intermingled in the same stream with the data of other tenants. Thus, it may be desirable to provide a mechanism to allow a tenant to ensure exclusive access to the stream.

Figure 6:
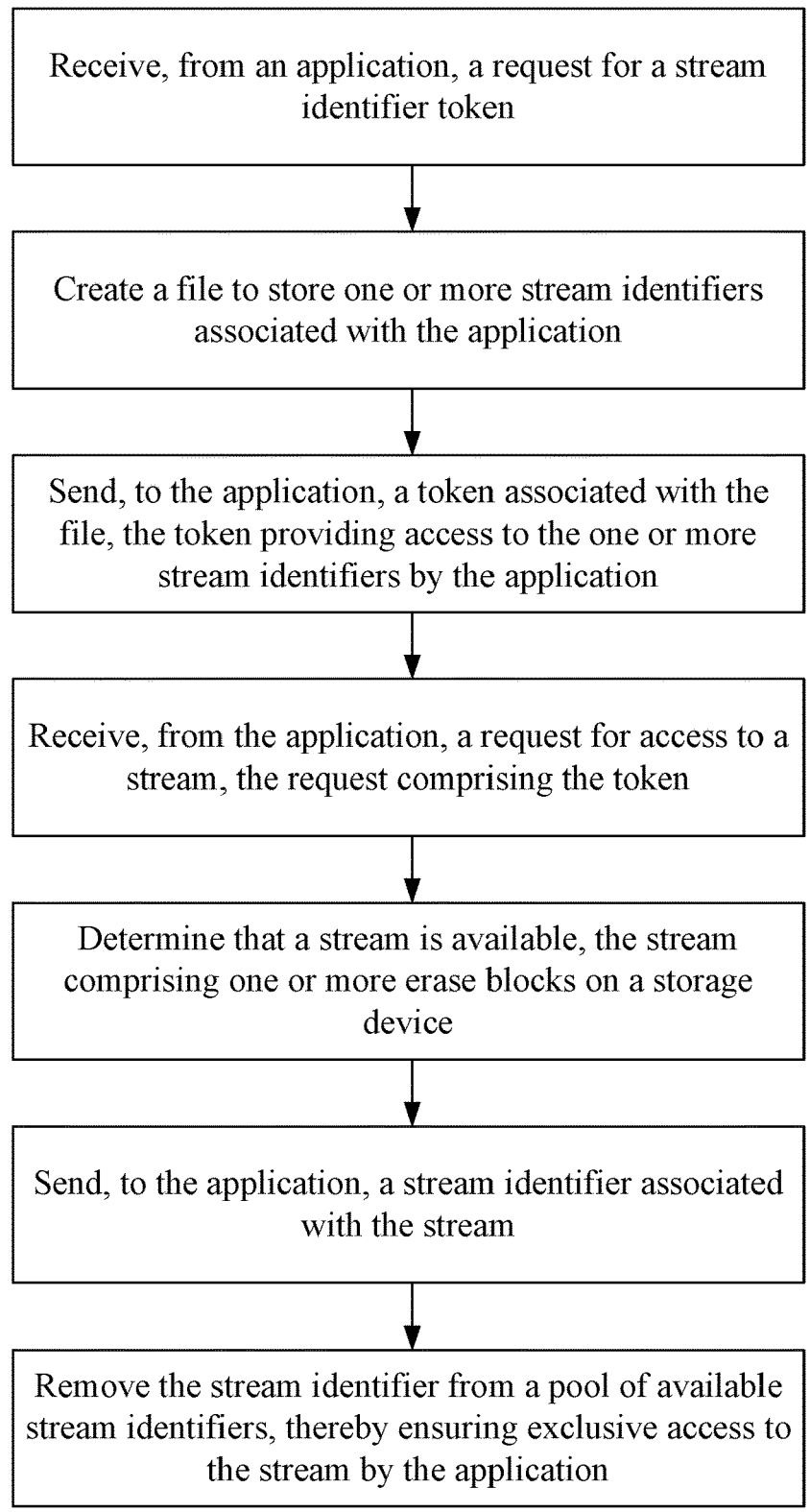
FIG. 6 illustrates a high-level method of ensuring exclusive access to a stream by an application.

An example method for granting exclusive access to a stream by an application is illustrated in FIG. 6. For example, the method may comprise receiving, from an application, a request for a stream identifier token, creating a file to store one or more stream identifiers associated with the application, sending, to the application, a token associated with the file, the token providing access to the one or more stream identifiers by the application, receiving, from the application, a request for access to a stream, the request comprising the token, determining that a stream is available, the stream comprising one or more erase blocks on a storage device, sending, to the application, a stream identifier associated with the stream, and removing the stream identifier from a pool of available stream identifiers, thereby ensuring exclusive access to the stream by the application.

Figure 7:
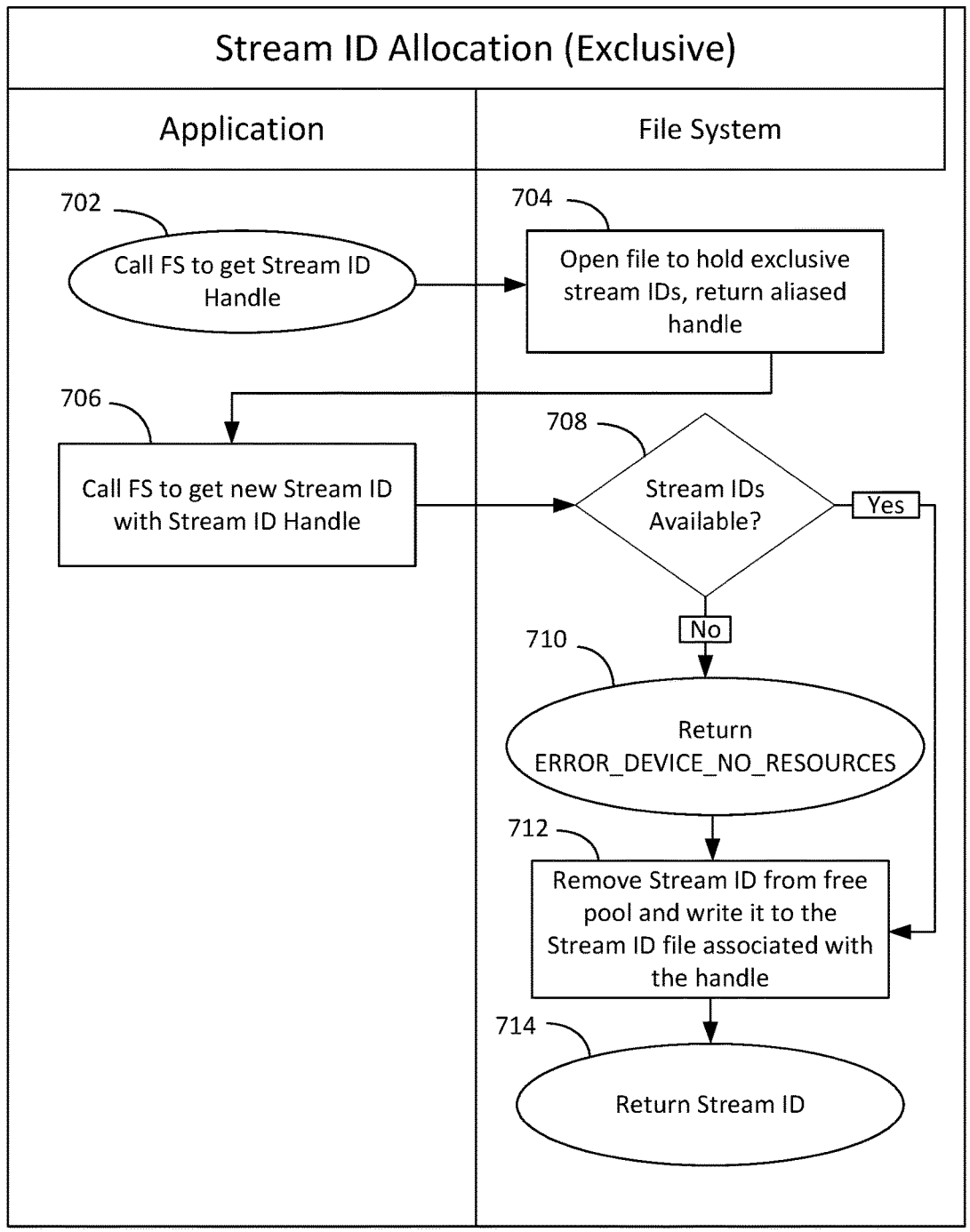
FIG. 7 illustrates a method for requesting a stream identifier handle and obtaining exclusive access to a stream.
Figure 8:
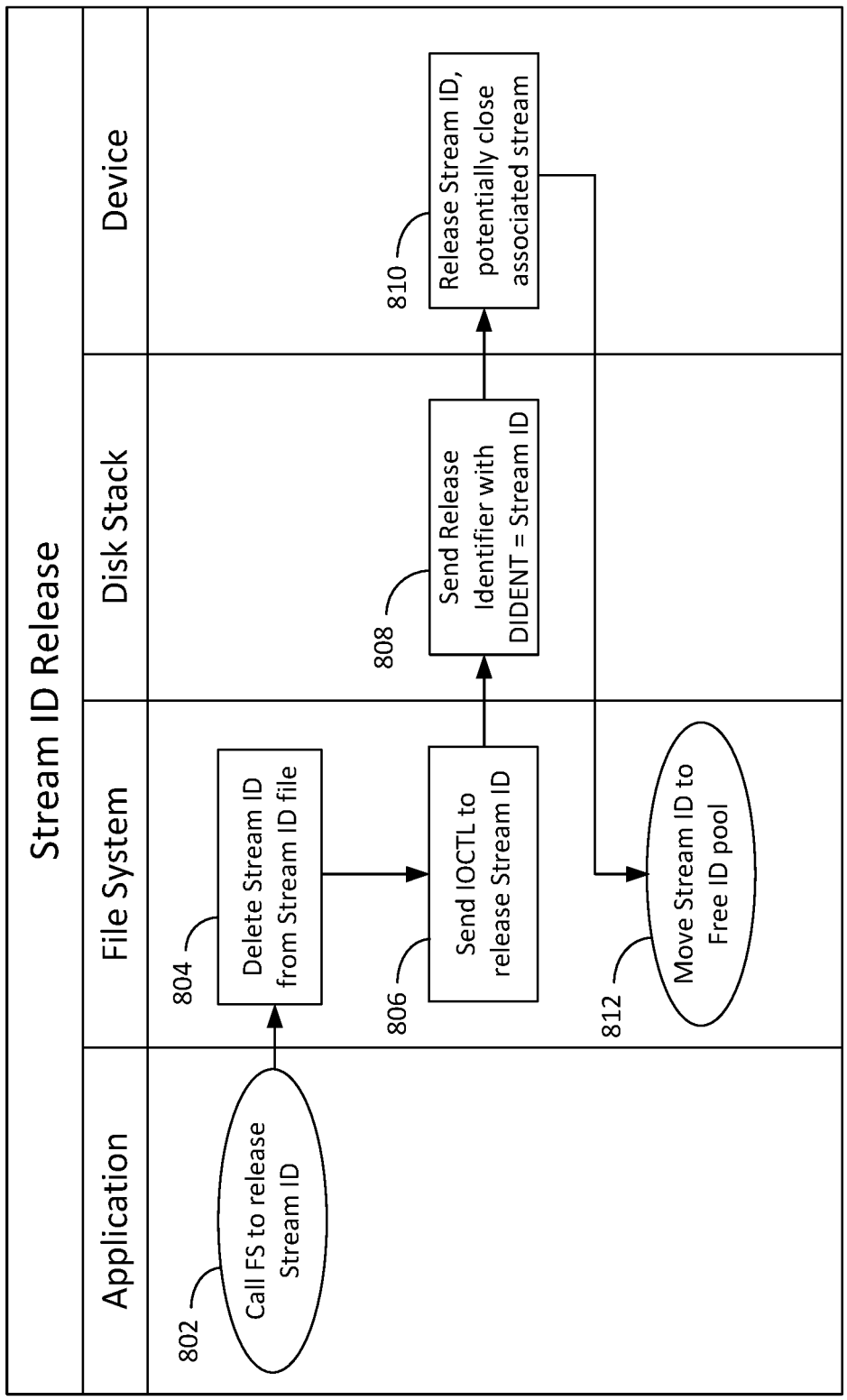
FIG. 8 illustrates a method of releasing a stream identifier.
Figure 9:
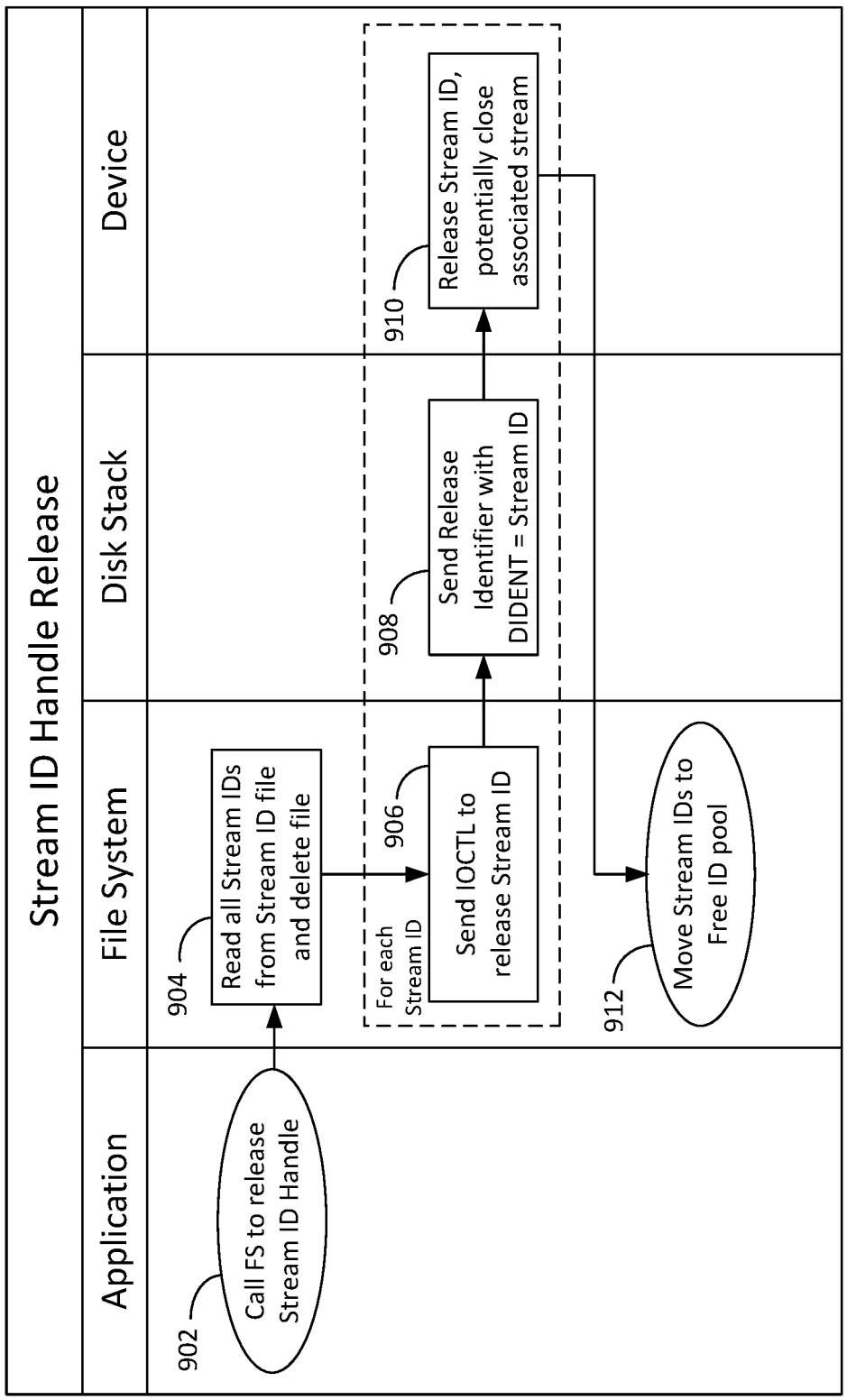
FIG. 9 illustrates a method of releasing a stream identifier handle.

FIGS. 7-9 illustrate in further detail methods and systems for granting and removing exclusive access to one or more streams by an application. The processes illustrated in FIGS. 7-9 are described in the context of an example implementation that utilizes NVMe-specific protocols. However, it is understood that the processes disclosed herein are not limited to this example implementation. Rather, the methods disclosed herein may be implemented in other embodiments using, for example, SATA, SCSI, or any other suitable storage devices.

FIG. 7 illustrates a flow chart for an example method 700 for granting exclusive access to a stream by a tenant, for example, an application residing on a computing device. As shown at step 702 of FIG. 7, a file system, such as, for example, file system 504 illustrated in FIG. 5, may be configured to receive from an application, such as, for example, application 502 illustrated in FIG. 5, a request for a stream identifier token. The stream identifier token may be used by the file system 504 to verify that the application 502 has access to one or more streams available on the SSD 508. In one example, the stream identifier token may be a stream identifier handle. In another example, the stream identifier token may be a pointer that points to an in-memory data structure. However, it is understood that the token it not limited to either of these examples and may be any kind of token.

As shown at step 704, the file system 504 may be configured to create a file to store one or more stream identifiers associated with the application 502. For example, the file system 504 may be configured to store for the application 502 a first stream identifier and a second stream identifier, each of the stream identifiers corresponding to one or more erase blocks on the storage device. The file system 504 may be further configured to send, to the application 502, the token associated with the file, the token providing access to the one or more stream identifiers by the application 502. Since the file system 504 owns the internal file containing the list of stream identifiers associated with the application 502, the file system 504 may not want to give the actual stream identifier to the application 502. Thus, as shown in FIG. 7, the file system 504 may be configured to return to the application 502 an aliased stream identifier, such as an aliased stream identifier handle. While the application 502 may not be able to open the file with the aliased stream identifier handle, the file system 504 may use that aliased stream identifier handle to verify that the application 502 has access to the one or more streams in the file.

As shown at step 706, the file system 504 may be configured to receive, from the application 502, a request for access to a stream, the stream comprising one or more erase blocks on the storage device. The file system 504 may be further configured to receive, with the request for the stream identifier, the stream identifier token, such as the stream identifier handle illustrated in FIG. 7. As discussed herein, prior to granting exclusive access to the one or more streams by the application 502, the file system 504 may be configured to verify that the application 502 has access to the one or more streams using the stream identifier token.

As shown at step 708, the file system 504 may be configured to determine that a stream identifier is available. In one example, the file system may maintain a "master" list comprising a pool of available stream identifiers, and may make this determination based on the list. In another example, the file system 504 may send to the storage device 508 a request to determine if any stream identifiers are available.

As shown at step 710, if the file system 504 determines that there are no stream identifiers available, the file system 504 may return to the application 502 an indication that there are no streams available. This indication may notify the application 502, for example, that all of the streams supported on the SSD are currently occupied exclusively by other tenants, or alternatively, that the SSD does not support streaming. As shown in FIG. 7, this indication may comprise an ERROR_DEVICE_NO_RESOURCES status code returned from the file system 504 to the application 502.

As shown at step 712, if the file system 504 determines that there are one or more stream identifiers available, and thus that there are available streams for which the application 502 may be granted exclusive access, the file system 504 may be configured to remove a given stream identifier from the pool of available stream identifiers, thereby ensuring exclusive access to the stream by the application 502. Once the stream identifier is removed from the pool of available stream identifiers, another application seeking access to a stream on the SSD may not be able to access the stream corresponding to the removed stream identifier.

As shown at step 714, the file system 504 may be configured to send, to the application 502, the stream identifier associated with the stream. Upon receipt of the stream identifier, the application 502 may have exclusive access to each of the one or more erase blocks associated with the corresponding stream.

As discussed herein, streaming functionality may be enabled on a storage device, such as the SSD 508 illustrated in FIG. 5. The SSD 508 may be configured to send to the file system 504 an indication of the stream resources available on the SSD 508, such as, for example, the number of streams available and the amount of available storage on each of the streams. However, the stream resources available on the SSD 508 may be limited. For example, the SSD 508 may send to the file system 504 an indication that there are a maximum of sixteen streams that are available for exclusive use by a given application, such as application 502. If there are multiple applications writing to the SSD 508, the amount of stream resources might not be enough to ensure that each stream is accessed exclusively by only one application.

Multi-tenant use of a particular stream may result in a number of problems. For example, data is generally "streamed" to particular erase blocks on the SSD based on an estimated deletion time of the data. However, if a first application is writing data having a first estimated deletion time to a stream, and a second application is writing data having a second estimated deletion time to the same stream, the benefits made available by the streaming functionality may be essentially eliminated. For example, the SSD may still be required to perform garbage collection on the data having the second estimated deletion time before it is able to delete the data having the first estimated deletion time. In another example, allowing the second application to write data to the same stream may result in the data of the first application being overwritten by that of the second application. Using the methods discussed herein, the file system may ensure that a given application has exclusive access to a particular stream.

In one embodiment, the file system 504 may be configured to manage write operations to the stream by application 502. For example, the file system 504 may be configured to receive, from the application 502, a request to write data to the stream. The request to write data to the stream may comprise the stream identifier token. As discussed herein, the file system 504 may be further configured to verify, based on the received token, that the application 502 has access to the stream. In response to verifying that the application 502 has access to the stream, the file system 504 may be configured to send to the storage device 508 the request to write data to the stream. Upon receiving the request, the storage device 508 may be configured to write the data to the one or more erase blocks associated with the stream.

As discussed herein, the file system 504 may send to the application 502 a stream identifier token, such as a stream identifier handle, that may be used to authenticate the application 502 upon receiving a request for exclusive access to a stream. The file system 504 may be configured to send to the application 502 only a single stream identifier token. This stream identifier token may be used by the application 502 each time it wants to obtain exclusive access to a stream. In other words, the application 502 may use the same stream identifier token each time it sends a request to the file system 504 for a stream identifier. For example, the file system 504 may be configured to receive, from the application 502, a request for access to a second stream, the request comprising the token. The token may be the same token that the application 502 received from the file system 504 upon sending a request to the file system 504 for the first stream identifier. The file system 504 may be further configured to verify that the application 502 has access to the second stream based on the received token, determine that the second stream is available, send a second stream identifier associated with the second stream to the application 502, and to remove the second stream identifier from the pool of available stream identifiers, thereby ensuring exclusive access to the second stream by the application 502.

As further discussed herein, granting exclusive access to a stream by one application may comprise removing the stream identifier from a pool of available stream identifiers. For a storage device comprising eight streams, each of which are intended to be used exclusively, a maximum of eight tenants or applications may be granted exclusive access to one or more of the streams. Thus, for an application seeking access to a stream on the storage device, each of the stream identifiers already having been assigned to a given one of the existing applications, the file system 504 may be configured to send to the application an indication that there are no streams available. For example, the file system 504 may be configured to receive, from a second application, a request for access to a stream, determine that there are no available stream identifiers in the pool of available stream identifiers, and to send, to the second application, an indication that the stream is not available.

FIG. 8 illustrates a flowchart for an example method 800 for releasing a stream identifier. An application, such as application 502 illustrated in FIG. 5, may send to a file system, such as file system 504 illustrated in FIG. 2, a request to release a stream identifier in order to indicate that the application 502 no longer needs exclusive access to the one or more erase blocks associated with the given stream.

As shown at step 802, the file system 504 may receive, from the application 502, a request to release the stream identifier. Releasing the stream identifier may comprise removing any association between the application 502 and the stream identifier. The request may comprise the token, for example, the stream identifier handle. The file system 504 may use the token to ensure that the application 502 has exclusive access to the stream associated with the stream identifier.

As shown at step 804, the file system 504 may delete the stream identifier from the file. As discussed herein, the file may comprise one or more stream identifiers assigned to or associated with the application. When the file associated with application 502 contains the stream identifier, the file system 504 may ensure that only application 502 has access to that stream. However, upon receiving a request to release the stream identifier from the application 502, the file system 504 may remove or delete the stream identifier from the file associated with the application 502, thus removing exclusive access to the stream by the application 502.

As shown at step 806, the file system 504 may send to a storage driver, such as storage driver 506 illustrated in FIG. 5, an indication to release the stream identifier. In the example of FIG. 8, the storage driver may be a disk stack. As further illustrated in the example of FIG. 8, in an NVMe specific protocol, the indication may comprise an input/output control call (IOCTL) from the file system 504 to the storage driver 506 to release the stream identifier.

As shown at step 808, the storage driver 506 may send to the device, such as the SSD 508 illustrated in FIG. 5, an indication to release the stream identifier. As shown in FIG. 8, in an NVMe specific protocol, this may comprise sending to the device a Release Identifier Command with DIDENT=Stream ID.

As shown at step 810, the device 508, upon receiving the indication from the storage driver 506, may be configured to release the stream identifier. In one example, the device 508, after releasing the stream identifier, may be configured to close the associated stream. Closing the associated stream may comprise disassociating the stream identifier and the corresponding stream, as further discussed herein.

As shown at step 812, the file system 504 may receive from the device 508 an indication that the stream identifier has been released. The file system 504 may be configured to add the stream identifier to the pool of available stream identifiers. Adding a given stream identifier to the pool of available stream identifiers may comprise making the given stream identifier available to one or more other applications. For example, upon requesting access to a stream, an application may receive from the file system 506 the given stream identifier, thus granting that application exclusive access to the corresponding stream. Application 502, having previously released the stream identifier, may no longer have access to the one or more erase blocks associated with that stream.

FIG. 9 illustrates a flowchart for an example method 900 for releasing a stream identifier token. An application, such as application 502 illustrated in FIG. 5, may send to a file system, such as file system 504 illustrated in FIG. 4, a request to release a stream identifier token in order to indicate that the application 502 no longer needs access to the streaming functionality made available by the device 508.

As shown at step 902, the file system 504 may receive, from the application 502, a request to release the token. The request may comprise the stream identifier token, for example, the stream identifier handle. The file system 504 may use the token to ensure that the application has access to the streaming functionality made available by the device 508. Releasing the stream identifier token may comprise removing any association between the application 502 and each of the stream identifiers assigned to or associated with the application 502. Upon release of the token, the application 502 may no longer be able to use the streaming functionality made available by the device 508 without receiving a new token from the file system 504.

As shown at step 904, the file system 504 may determine one or more stream identifiers associated with the application 502. For example, the file system 504 may read the stream identifiers in the stream identifier file associated with the application 502. As discussed herein, the file may comprise one or more stream identifiers assigned to or associated with the application. However, after receiving a request to release the stream identifier handle, the file system 504 may determine that the file is no longer needed as a result of all of the stream identifiers associated with the application 502 being released, and may be configured to delete the file.

As shown at step 906, for each stream identifier associated with the application, the file system 504 may send to a storage driver, such as storage driver 506 illustrated in FIG. 5, an indication to release the stream identifier. In the example of FIG. 8, the storage driver may be a disk stack. As further illustrated in the example of FIG. 8, in an NVMe specific protocol, the indication may comprise an input/output control call (IOCTL) from the file system 504 to the storage driver 506 to release the stream identifiers.

As shown at step 908, for each stream identifier associated with the application, the storage driver 506 may send to the device, such as the SSD 508 illustrated in FIG. 5, an indication to release the stream identifier. As shown in FIG. 8, in an NVMe specific protocol, this may comprise sending to the device a Release Identifier Command with DIDENT=Stream ID.

As shown at step 910, for each stream identifier associated with the application, the device 508, upon receiving the indication from the storage driver 506, may be configured to release the stream identifier. In one example, the device 508, after releasing the stream identifier, may be configured to close the associated stream. Closing the associated stream may comprise removing any association between the stream identifier and the corresponding stream, as further discussed herein.

As shown at step 912, for each stream identifier associated with the application, the file system 504 may receive from the device 508 an indication that the stream identifier has been released. The file system 504 may be configured to add the one or more stream identifiers to the pool of available stream identifiers. Adding a given stream identifier to the pool of available stream identifiers may comprise making the given stream identifier available to one or more other applications. For example, upon requesting access to a stream, an application may receive from the file system 504 the given stream identifier, thus granting that application exclusive access to the corresponding stream. Application 502, having previously released the stream identifier, may no longer have access to the one or more erase blocks associated with that stream.

As discussed herein, the file system 504 may comprise a "master" file containing a pool of stream identifiers made available by the storage device 508 at a given time. These available stream identifiers may be exposed to the file system 504 by the storage device 508. As discussed herein, when a tenant, such as an application residing on a computing device, wants exclusive access to the stream, the file system 504 may create a file specific to that application and may move the stream identifier from the pool of available stream identifiers to the file associated with the application 502. The file system 504 may also create a token for gaining access to this folder.

As further discussed herein, the token may be an alias to the internal file associated with the application 502. Since the file system 504 owns the internal file containing the list of available stream identifiers associated with that application, the file system 504 may not want to give the actual file handle to the application 502. The application 502 may not be able to open the file with the aliased stream identifier handle, but the file system 504 may use that aliased stream identifier handle to verify that the application has access to the one or more streams in the file. In addition, since only the application 502 possesses the token to access this file, the stream identifier may not be viewed by other applications wishing to access the streaming functionality of the SSD 508.

The file system 504 may be configured to remove any association between an application 502 and a given stream identifier in response to a request from the application 502 to release the particular stream identifier or the stream identifier handle associated with the application 502. The file system 504 may further add the stream identifier back to the pool of available stream identifiers. At this point, the stream identifier may be made available to one or more other applications residing on the computing device. However, the same stream identifier may point to a different location on the SSD 508, such as a different group of erase blocks, when assigned to a new application. For example, a first application may have exclusive access to stream identifier 1 on the storage device 508. Stream identifier 1 may correspond to erase blocks A-C on the storage device 508. After some time, the first application may no longer need access to the stream and may request that the file system release stream identifier 1 from its file. The file system may then add stream identifier 1 back to the pool of available stream identifiers, and may send an indication to the storage device 508 that the application no longer needs exclusive access to erase blocks A-C. Subsequently, a second application may request exclusive access to stream identifier 1. The file system 504 may once again remove stream identifier 1 from the pool of available stream identifiers and add stream identifier 1 to the file associated with the second application. However, it may not be the case that stream identifier 1 still corresponds to erase blocks A-C on the storage device. Instead, the second application may have access to a different group of erase blocks, such as erase blocks D-F now associated with stream identifier 1.

The file system 504 may implement a number of API calls in granting and removing exclusive access to a stream. For example, when GetStreamIDHandle( ) is called, the file system 504 may create an internal, exclusive access file to store the stream identifiers and may return an aliased handle to the application 502. When GetStreamID( ) is called, the file system 504 may remove a stream identifier from the pool of available stream identifiers, use the given handle to write the stream identifier to the file, and return the stream identifier to the application 502. When Release StreamID( ) is called, the file system 504 may use the given handle to delete the stream identifier from the file, send an IOCTL to the disk stack to release the stream identifier, and return the stream identifier to the pool of available stream identifiers. When ReleaseStreamIDHandle( ) is called, the file system 504 may read all the stream identifiers from the file, delete the file and close the stream identifier handle, send an IOCTL to the disk stack to release the stream identifiers, and return all stream identifiers from the file to the free stream identifier pool.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The various illustrative logical blocks, configurations, modules, and method steps or instructions described in connection with the aspects disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present disclosure.

The various illustrative logical blocks, configurations, modules, and method steps or instructions described in connection with the aspects disclosed herein, or certain aspects or portions thereof, may be embodied in the form of computer executable instructions (i.e., program code) stored on a computer-readable storage medium which instructions, when executed by a machine, such as a computing device, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed:

1. A method comprising:
receiving, from an application, a request for access to one or more streams;
creating a file to store one or more stream identifiers associated with the application;
sending, to the application, a token, the token providing access by the application to the one or more stream identifiers stored in the file;
receiving, from the application, a request for access to a stream, the request comprising the token;
determining that a stream is available, the stream comprising one or more erase blocks on a storage device;
removing a stream identifier associated with the stream from a pool of available stream identifiers;
adding the stream identifier to the file; and
sending, to the application, the stream identifier, thereby ensuring exclusive access to the stream by the application.

2. The method of claim 1, further comprising:
receiving, from the application, a request to write data to the stream, the request comprising the token;
verifying, based on the received token, that the application has access to the stream; and
sending, to the storage device, the request to write data to the stream.

3. The method of claim 1, further comprising:
receiving, from the application, a request for access to a second stream, the request comprising the token;
determining that the second stream is available;
removing a stream identifier associated with the second stream from the pool of available stream identifiers;
adding the stream identifier associated with the second stream to the file; and
sending, to the application, the stream identifier associated with the second stream, thereby ensuring exclusive access to the second stream by the application.

4. The method of claim 1, further comprising:
receiving, from the application, a request to release the stream identifier, the request comprising the token;
determining, based on the token, that the application has access to the stream identifier;
deleting the stream identifier from the file associated with the application; and
adding the stream identifier to the pool of available stream identifiers.

5. The method of claim 1, further comprising:
receiving, from the application, a request to release the token, the request comprising the token;
determining, based on the token, one or more stream identifiers associated with the application;
deleting the file associated with the application; and
adding the one or more stream identifiers to the pool of available stream identifiers.

6. The method of claim 1, wherein the token is a stream identifier handle.

7. The method of claim 1, further comprising:
receiving, from a second application, a request for access to a stream;
determining that there are no available stream identifiers in the pool of available stream identifiers; and
sending, to the second application, an indication that the stream is not available.

8. A computing device comprising a processing unit, a memory, and a file system executing on the processing unit, the file system when executing on the processing unit performing operations comprising:
receiving, from an application, a request for access to one or more streams;
creating a file to store one or more stream identifiers associated with the application;
sending, to the application, a token, the token providing access by the application to the one or more stream identifiers stored in the file;
receiving, from the application, a request for access to a stream, the request comprising the token;
determining that a stream is available, the stream comprising one or more erase blocks on a storage device;
removing a stream identifier associated with the stream from a pool of available stream identifiers;
adding the stream identifier to the file; and
sending, to the application, the stream identifier, thereby ensuring exclusive access to the stream by the application.

9. The computing device of claim 8, wherein the file system performs additional operations comprising:
receiving, from the application, a request to write data to the stream, the request comprising the token;
verifying, based on the received token, that the application has access to the stream; and
sending, to the storage device, the request to write data to the stream.

10. The computing device of claim 8, wherein the file system performs additional operations comprising:
receiving, from the application, a request for access to a second stream, the request comprising the token;
determining that the second stream is available;
removing a stream identifier associated with the second stream from the pool of available stream identifiers;
adding the stream identifier associated with the second stream to the file; and
sending, to the application, the stream identifier associated with the second stream, thereby ensuring exclusive access to the second stream by the application.

11. The computing device of claim 8, wherein the file system performs additional operations comprising:
receiving, from the application, a request to release the stream identifier, the request comprising the token;
determining, based on the token, that the application has access to the stream identifier;
deleting the stream identifier from the file associated with the application; and
adding the stream identifier to the pool of available stream identifiers.

12. The computing device of claim 8, wherein the file system performs additional operations comprising:
receiving, from the application, a request to release the token, the request comprising the token;
determining, based on the token, one or more stream identifiers associated with the application;
deleting the file associated with the application; and
adding the one or more stream identifiers to the pool of available stream identifiers.

13. The computing device of claim 8, wherein the token is a stream identifier handle.

14. The computing device of claim 8, wherein the file system performs additional operations comprising:
receiving, from a second application, a request for access to a stream;
determining that there are no available stream identifiers in the pool of available stream identifiers; and
sending, to the second application, an indication that the stream is not available.

15. A computer readable storage medium on which computer-executable instructions are stored which, when executed by a computing device, cause the computing device to perform operations comprising:
receiving, from an application, a request for access to one or more streams;
creating a file to store one or more stream identifiers associated with the application;
sending, to the application, a token, the token providing access by the application to the one or more stream identifiers stored in the file;
receiving, from the application, a request for access to a stream, the request comprising the token;
determining that a stream is available, the stream comprising one or more erase blocks on a storage device;
removing a stream identifier associated with the stream from a pool of available stream identifiers;
adding the stream identifier to the file; and
sending, to the application, the stream identifier, thereby ensuring exclusive access to the stream by the application.

16. The computer readable storage medium recited in claim 15, the computer-executable instructions further causing the computing device to perform operations comprising:
receiving, from the application, a request to write data to the stream, the request comprising the token;
verifying, based on the received token, that the application has access to the stream; and
sending, to the storage device, the request to write data to the stream.

17. The computer readable storage medium recited in claim 15, the computer-executable instructions further causing the computing device to perform operations comprising:
receiving, from the application, a request for access to a second stream, the request comprising the token;
determining that the second stream is available;
removing a stream identifier associated with the second stream from the pool of available stream identifiers;
adding the stream identifier associated with the second stream to the file; and
sending, to the application, the stream identifier associated with the second stream, thereby ensuring exclusive access to the second stream by the application.

18. The computer readable storage medium recited in claim 15, the computer-executable instructions further causing the computing device to perform operations comprising:
receiving, from the application, a request to release the stream identifier, the request comprising the token;
determining, based on the token, that the application has access to the stream identifier;
deleting the stream identifier from the file associated with the application; and
adding the stream identifier to the pool of available stream identifiers.

19. The computer readable storage medium recited in claim 15, the computer-executable instructions further causing the computing device to perform operations comprising:
- receiving, from the application, a request to release the token, the request comprising the token;
- determining, based on the token, one or more stream identifiers associated with the application;
- deleting the file associated with the application; and
- adding the one or more stream identifiers to the pool of available stream identifiers.

20. The computer readable storage medium recited in claim 15, the computer-executable instructions further causing the computing device to perform operations comprising:
- receiving, from a second application, a request for access to a stream;
- determining that there are no available stream identifiers in the pool of available stream identifiers; and
- sending, to the second application, an indication that the stream is not available.

* * * * *